US007009012B2

(12) United States Patent
Yoon et al.

(10) Patent No.: US 7,009,012 B2
(45) Date of Patent: Mar. 7, 2006

(54) SUPPORTED CATALYST FOR PRODUCING SYNDIOTACTIC STYRENIC POLYMER

(75) Inventors: Sung Cheol Yoon, Seoul (KR); Xuequan Zhang, Taegeon (KR); Jae Gon Lim, Taegeon (KR); Hyun Joon Kim, Taegeon (KR); Young Sub Lee, Taegeon (KR)

(73) Assignee: Samsung Atofina Co. Ltd., (KR)

( * ) Notice: Subject to any disclaimer, the term of this patent is extended or adjusted under 35 U.S.C. 154(b) by 317 days.

(21) Appl. No.: 10/169,330

(22) PCT Filed: Dec. 18, 2000

(86) PCT No.: PCT/KR00/01487

§ 371 (c)(1),
(2), (4) Date: Aug. 9, 2002

(87) PCT Pub. No.: WO01/49748

PCT Pub. Date: Jul. 12, 2001

(65) Prior Publication Data

US 2003/0109379 A1 Jun. 12, 2003

(30) Foreign Application Priority Data

Dec. 30, 1999 (KR) .............................. 1999-65823

(51) Int. Cl.
*C08F 4/64* (2006.01)
*C08F 4/42* (2006.01)

(52) U.S. Cl. ........................ 526/90; 526/129; 526/130; 526/154; 526/156; 526/347; 526/904; 502/62; 502/87; 502/109; 502/119; 502/120; 502/150; 502/152; 502/154

(58) Field of Classification Search ................ 502/109, 502/62, 87, 119, 120, 150, 152, 154; 526/129, 526/130, 154, 156, 347, 904, 90
See application file for complete search history.

(56) References Cited

U.S. PATENT DOCUMENTS 5,225,500 A 7/1993 Elder et al. ................. 526/127
5,278,265 A 1/1994 Razavi ........................ 526/170
5,492,978 A * 2/1996 Peifer et al. ................ 525/363
6,218,331 B1 * 4/2001 DiMaio et al. ............. 502/109
6,255,244 B1 * 7/2001 Yabunouchi ................. 502/80

FOREIGN PATENT DOCUMENTS

JP 03007705 1/1991
JP 06041235 2/1994

OTHER PUBLICATIONS

Mathew et al, Studies on the Hydrogenation of Alkenes and Alkynes Using Polymer Coated Silica-Pd Catalysts, Polymer International, 31 (1993) 119-125.*

Arai et al, Catalytic Vapor Phase Hydroformylation of Olefins Over Polymer-Immobilized Rhodium Complexes, Chemistry Letters, 265-268, 1975.*

Ishihara, N. et al, Crystalline Syndiotactic Polystyrene, *Macromolecules*, 1986, 19, 2464.

Kaminsky, W. et al., “Polymerization of Styrene with Supported Half-Sandwich Complexes”, *J. Polym. Sci.* (*Part A*),*Poly Chem.*, 199, 37, 2959-2968.

Spitz, R. et al., “Improvement of Supported Catalysts for Syndiotactic Polymerization of Styrene”, *Macromol Chem Phys.*, 1999, 200, 1453-1457.

Yu, G. et al., “Polymer-Supported Titanium Catalysts for Syndiotactic Polymerization of Styrene”, *J. Polymer Science,:Part A: Polymer Chemistry.*, 1996, 34, 2237-2241.

* cited by examiner

*Primary Examiner*—Fred Teskin
(74) *Attorney, Agent, or Firm*—Woodcock Washburn LLP

(57) ABSTRACT

The present invention provides a supported catalyst comprising (A) a polymer (B) a supporter, (C) a transition metal compound, and optionally (D) (a) a compound which can form an ionic complex by the reaction with the transition metal compound or (b) a specific oxygen-containing compound, and (E) an alkylaluminum compound. The supported catalyst according to present invention, which has a high activity, can be used for preparing a styrenic polymer with a high syndiotacticity. The supported catalyst can be used in combination with a cocatalyst, preferably an alkyl aluminoxane.

24 Claims, 1 Drawing Sheet

SUPPORTED CATALYST FOR PRODUCING SYNDIOTACTIC STYRENIC POLYMER

FIELD OF THE INVENTION

The present invention relates to a supported catalyst for preparing a syndiotactic styrenic polymer. More particularly, the present invention relates to a supported catalyst having high activity for preparing a styrenic polymer with a high syndiotacticity and a high crystallinity.

BACKGROUND OF THE INVENTION

Syndiotactic polystyrene (sPS) was first synthesized in 1986 (Ishihara et al., Macromolecules 1986, 19, 2464), using the homogeneous organometallic catalytic system based on a titanium compound and methylaluminoxane (MAO). Syndiotactic polystyrene is a very attractive polymer. The polymer shows a low specific gravity, a low dielectric constant, a high modulus of elasticity and an excellent resistance to chemicals. Accordingly the syndiotactic polystyrene has become a promising material for various applications in the automotive, electronic and packaging industries.

However, the commercialization of a syndiotactic polystyrene has some serious problems, i.e. serious reactor fouling or lump, and low flowability of the product powder resulted from its unsatisfactory morphology. The problems are remained unsolvable if only using a homogeneous catalyst. These problems are solved by using a catalyst supported to an organic or inorganic support instead of using a general homogeneous catalyst on polymerization. However, the activity of a supported catalyst is generally much lower than that of the corresponding homogeneous catalyst by the order of magnitude of 2–3, and the polymerization activity of a syndiotactic polystyrene is, generally, much lower than that of polyolefin. Therefore it is very difficult to prepare a supported catalyst having acceptable activity for producing a syndiotactic polystyrene.

So far, four basic methods have been developed for metallocene catalyst systems for production of polyolefin as follow:

1. direct adsorption of metallocene into the support surface involving physisorption or chemisorption of metallocene (direct heterogenization);

2. initial adsorption of methylaluminoxane (MAO) into the support, followed by adsorption of metallocene (indirect heterogenization);

3. covalent bonding of metallocene to a carrier by a ligand, followed by activation with MAO; and 4. use of an organic compound which is able to react with the hydroxyl group of an inorganic support surface such as silica and to form a complex with metallocene to be supported, which is represented by the following reaction as one example:

Si—OH+HO—R—OH→Si—O—R—OH→
Si—R—O . . . Metallocene where R is a hydrocarbon compound.

Either the direct loading of a metallocene catalyst on a support (Method 1) or the indirect loading on a MAO treated support (Method 2, Kaminsky et al., J. Polym. Sci.: Part A: Polym. Chem. 1999, 37, 2959) does not provide a good activity for styrenic polymerization. Method 3 relates to a complex chemistry and difficulties arise when bonding the metallocene to the support surface. A spacer between support and metallocene was introduced in Method 4, but the results, as reported by Spitz et al. (Macromol. Chem. Phys. 1999, 200, 1453), show that there is no any enhancement of styrene polymerization activity.

Until now, very few reports can be seen in the area of supported catalyst for producing syndiotactic polystyrene. Silica (Kaminsky et al., J. Polym. Sci.: Part A: Polym. Chem. 1999, 37, 2959), alumina (Spitz et al., Macromol. Chem. Phys. 1999, 200, 1453) and polymer (Yu et al., J. Polym. Sci.: Part A: Polym. Chem. 1996, 34, 2237) have been used as a support for preparation of a supported catalyst for producing syndiotactic polystyrene. Unfortunately, all these supported catalysts are not applicable because of extremely low activity. Therefore, a supported catalyst with high activity for producing syndiotactic styrenic polymer is highly expected.

Accordingly, the present inventors have developed a supported metallocene catalyst with a high activity in combination with a cocatalyst for preparing a styrenic polymer with a high syndiotacticity.

SUMMARY OF THE INVENTION

The present invention provides a supported catalyst comprising (A) a polymer, (B) a supporter, (C) a transition metal compound, and optionally (D) (a) a compound which can form an ionic complex by the reaction with the transition metal compound or (b) a specific oxygen-containing compound, and (E) an alkylaluminum compound. The supported catalyst can be used in combination with a cocatalyst, preferably an alkyl aluminoxane.

A feature of the present invention is to provide a supported catalyst with a high activity for preparing a styrenic polymer having a high syndiotacticity.

Another feature of the present invention is to provide a supported catalyst for preparing a styrenic polymer, which can significantly diminish reactor fouling or lump on polymerization, and prepare a polymer having a good flowability and a high crystallinity.

Other features and advantages of this invention will be apparent from the ensuing disclosure and appended claims.

DETAILED DESCRIPTION OF THE INVENTION

Catalyst System

Figure 1:
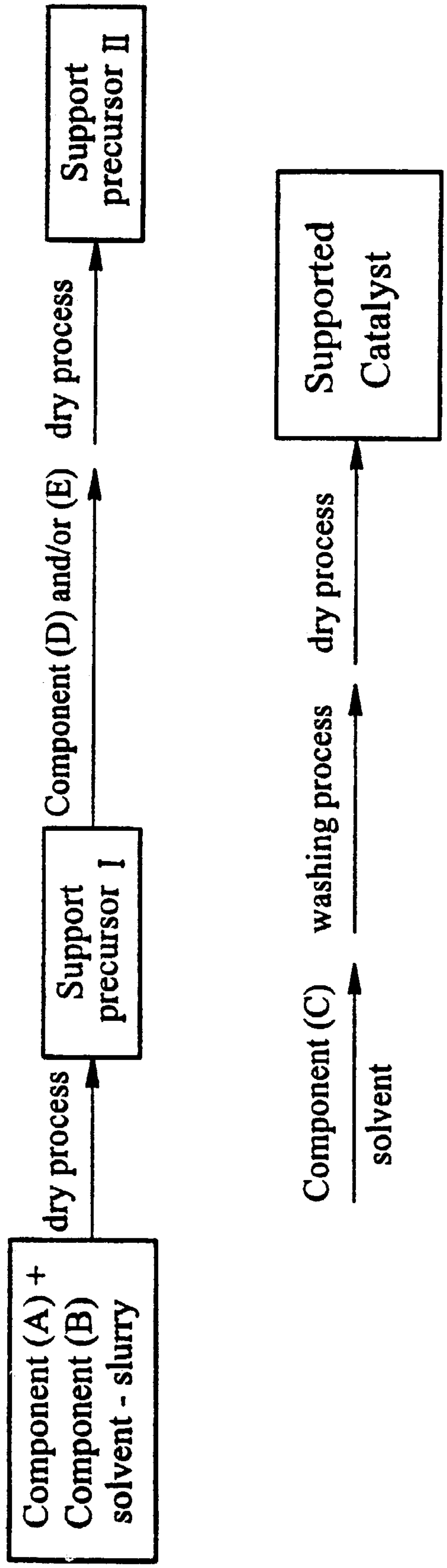
FIG. 1 is a schematic diagram of a process for preparing a supported catalyst according to the present invention.

The present invention provides a supported catalyst comprising (A) a polymer, (B) a support, (C) a transition metal compound, and optionally (D) (a) a compound which can form an ionic complex by the reaction with the transition metal compound or (b) a specific oxygen-containing compound, and (E) an alkylaluminum compound. The detailed description of each component of a catalyst system is as follows.

(A) Polymer

It is believed that the key point to obtain a high activity metallocene supported catalyst is to insulate the metallocene catalyst to be supported from the poisonous surface of the support, mostly silica, without deterioration of the advantages of the supported catalyst.

For instance, when a homogeneous catalyst reacts with an inorganic support, the catalyst can be apt to react with hydroxyl groups or Si—OH groups in case of silica on the surface of a support. However, the method is not effective because, even though the hydroxyl groups of the support are capped, the non-hydroxyl group area of the surface of the support (—Si—O—Si—, in case of silica) still remains bare. The bare acidic surface is poisonous to the catalyst, so results in rapid declination of the catalytic activity. Therefore, this method has been reported not to be effective.

With this thought in mind, the present inventors have used a polymer to completely insulate the homogeneous catalyst to be supported from the poisonous surface, i.e. oxygen atom (—Si—O—Si—) of the support, thereby functioning an insulation layer between the catalyst and the support. Thus, the polymer of the present invention should be harmless to catalytic performances, have chemical or physical interaction with the catalyst and support, and be insoluble in the styrenic monomer or polymerization solvent after loading a catalyst.

The polymers to meet the requirements described above are organic polymers containing particular polar groups. The particular polar groups of the polymer interact chemically or physically with the surface of a support. Accordingly the polymer can be completely absorbed on the surface of the support to form an insulation film, somewhat like a coating process. And the polar groups absorb a metallocene catalyst to be supported by formation of a stable complex. Therefore the coating film acts an insulator for support on loading a homogeneous catalyst.

Representative polymers suitable for this purpose include acrylonitrile-containing polymers and copolymers, hydroxyl group-containing polymer and copolymers, acrylic and acrylate polymers and copolymers, maleic anhydride-containing copolymers and maleic anhydride modified polymers, acetate containing polymers and copolymers, polyethers, polyketones, and polyamide polymer and copolymer.

Specific examples of the acrylonitrile-containing polymers and copolymers are polyacrylonitrile, poly(acrylonitrile-block-styrene), poly(styrene-co-acrylonitrile), acrylonitrile-butadiene-styrene resin, poly(acrylonitrile-co-butadiene), poly(acrylonitrile-co-isoprene), etc. The acrylonitrile content in the copolymers is not specifically limited, but is usually about from 0.1 to 100% by weight, preferably about from 2 to 50% by weight. And the degree of the poly(styrene-co-acrylonitrile) is preferably at least about 5.

The amount of polymer for the insulation layer is not limited, but is preferably in the range of about 0.0001 to 99.999% by weight as per the supported catalyst.

(B) Support

A support used for preparation of the supported catalyst according to the present invention includes both inorganic supports and organic supports.

The representative examples of the inorganic supports include silica gel, alumina, silica-alumina gel, zeolite, mica powder, clays, molecular sieves, metal oxide compounds, metal halogenides, metal carbonates and metal powder. Silica gel, silica-alumina gel and alumina are most preferable among the inorganic solids. An organic solid may include poly(styrene-co-divinylbenzene) beads, and starch powder, etc.

The amount of support is not limited, but is preferably in the range of about 0.0001 to 99.999% by weight as per the supported catalyst.

The transition metal compound used as a homogeneous catalyst in the present invention is a Group IVB metal compound represented by the following formula (I) or (II):

$$MR^1_aR^2_bR^3_cX_{4-(a+b+c)} \quad (I)$$

$$MR^1_dR^2_eX_{3-(d+e)} \quad (II)$$

where M is an atom of Group IVB, $R^1$, $R^2$ and $R^3$ are independently a hydrogen atom, an alkyl group having 1 to 20 carbon atoms, an alkoxy group having 1 to 20 carbon atoms, an aryl group having 6 to 20 carbon atoms, an alkylaryl group having 6 to 20 carbon atoms, an arylalkyl group having 6 to 20 carbon atoms, an aryloxy group having 1 to 20 carbon atoms, a cyclopentadienyl group, a substituted cyclopentadienyl group or an indenyl group, X is a halogen atom, a, b and c are an integer of 0 to 4, and d and e are an integer of 0 to 3.

Representative examples of the alkyl group having 1 to 20 carbon atoms as represented by $R^1$, $R^2$ or $R^3$ are a methyl, an ethyl, a propyl, a butyl, an amyl, an isoamyl, an isobutyl, an octyl and a 2-ethylhexyl.

Representative examples of the alkoxy group having 1 to 20 carbon atoms are a methoxy, an ethoxy, a propoxy, a butoxy, an amyloxy, a hexyloxy and a 2-ethylhexyloxy.

Representative example of the aryl, alkylaryl or arylalkyl having 6 to 20 carbon atoms are a phenyl, a tolyl, a xylyl and a benzy group.

In the general formulae (I) and (II), $R^1$, $R^2$ and $R^3$ may be the same or different one another.

The transition metal component (C) used for preparation of the supported catalyst according to the present invention further includes, besides single nuclear catalysts as represented in formulae (I) or (II), binuclear and multiple-nuclear catalysts as well.

The binuclear catalyst is represented by the following formula (III), (IV) or (V):

$$R^1_dR^2_eX^1_{3-(d+e)}M^1—O—R^4—O—M^2R^1_dR^2_eX^1_{3-(d+e)} \quad (III)$$

(IV)

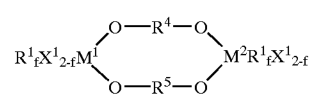

(V)

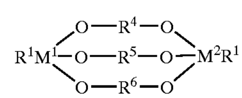

where $M^1$ and $M^2$ is independently a IVB group atom of the Periodic Table; $R^4$, $R^5$, and $R^6$ are independently an alkylene group having 1 to 20 carbon atoms, an arylene group having 6 to 20 carbon atoms, an alkylarylene group having 6 to 20 carbon atoms, an arylalkylene group having 6 to 20 carbon, a cyclopentadienylene group, a substituted cyclopentadienylene group or an indenylene group; and f is independently an integer of 0 to 2.

Examples of the alkyl group having 1 to 20 carbon atoms as represented by $R^4$, $R^5$, and $R^6$ include a methylene, an ethylene, a propylene, a butylene, an amylene, an isoamylene, an isobutylene, an octylene, and a 2-ethylhexylene group; and examples of the arylene, alkylarylene, or arylalkylene group having 6 to 20 carbon atoms include a phenylene, a tolylene, a xylylene, and a benzylene group. $R^4$, $R^5$, and $R^6$ may be the same or different.

In the general formulae (III), (IV) and (V), $R^4$, $R^5$ and $R^6$ may be identical or different from one another.

The multi-nuclear catalyst is represented by the formula (VI):

$$R^7\!-\!\!(O\!-\!MR^1_dR^2_eX^1_{3-(d+e)})_n \qquad \text{(VI)}$$

where $R^7$ is an alkyl group having 1 to 20 carbon atoms, an aryl group having 6 to 20 carbon atoms, an alkylaryl group having 6 to 20 carbon atoms, an arylalkyl group having 6 to 20 carbon, a cyclopentadienyl group; the polymerization degree of the polymer is 5 to 10000; and n is an integer of 0 to 1000.

The transition metal compound (C) may be used alone or in combination of two or more types. The amount of the transition metal compound (C) is not limited, but is preferably in the range of about 0.0001 to 30.0% by weight as per the supported catalyst.

(D) Compound, Which Can Form an Ionic Complex by the Reaction With a Transition Metal Compound, or Oxygen-Containing Compound In the preparation process of the supported catalyst of the present invention, (a) a compound, which can form an ionic complex by the reaction with a transition metal compound, or (b) an oxygen-containing compound may be optionally used. The above component (a) is composed of an anion and a cation.

Specific examples of the anion include $B(C_6F_5)_4^-$, $B(C_6HF_4)_4^-$, $B(C_6H_2F_3)_4^-$, $B(C_6H_3F_2)_4^-$, $B(C_6H_4F)_4^-$, $B(C_6CF_3F_4)_4^-$, $BF_4^-$, $PF_6^-$, $P(C_6F_5)_6^-$, and $Al(C_6HF_4)_4^-$. Specific examples of the metal cation include $Cp_2Fe^+$, $(MeCp)_2Fe^+$, $(tButCp)_2Fe^+$, $(Me_2Cp)_2Fe^+$, $(Me_3Cp)_2Fe^+$, $(Me_4Cp)_2Fe^+$, $(Me_5Cp)_2Fe^+$, $Ag^+$, $Na^+$, and $Li^+$. Other examples of the cation include ions containing nitrogen such as a pyridinium ion, 2,4-dinitro-N,N-diethylanilinium ion, diphenyl ammonium ion, p-nitroanilinium, 2,5-dichloroanilinium ion, p-nitro-N,N-dimethylanilinium ion, quinolinium ion, N,N-dimethylanilinium ion, and N,N-diethylanilinium ion; carbenium compounds such as triphenylcarbenium ion, tri(4-methylphenyl)carbenium ion, and tri(4-methoxyphenyl)carbenium ion; an alkylphosphonium ion such as $CH_3PH_3^+$, $C_2H_5PH_3^+$, $C_3H_7PH_3^+$, $(CH_3)_2PH_2^+$, $(C_2H_5)_2PH_2^+$, $(C_3H_7)_2PH_2^+$, $(CH_3)_3PH^+$, $(C_2H_5)_3PH^+$, $(C_3H_7)_3PH^+$, $(CF_3)_3PH^+$, $(CH_3)_4P^+$, $(C_2H_5)_4P^+$, and $(C_3H_7)_4P^+$; and arylphosphonium ion such as $C_6H_5PH_3^+$, $(C_6H_5)_2PH_2^+$, $(C_6H_5)_3PH^+$, $(C_6H_5)_4P^+$, $(C_2H_5)_2(C_6H_5)PH^+$, $(CH_3)(C_6H_5)PH_2^+$, $(CH_3)_2(C_6H_5)PH^+$ and $(C_2H_5)_2(C_6H_5)_2PH^+$.

The compound (a), which can form an ionic complex by the reaction with the transition metal compound of the component (C), is a borate compound. The borate compound includes $B(C_6F_5)_3$, $B(C_6HF_4)_3$, $B(C_6H_2F_3)_3$, $B(C_6H_3F_2)_3$, $B(C_6H_4F)_3$, $B(C_6CF_3F_4)_3$, $BF_3$, $PF_5$, $P(C_6F_5)_5$, and $Al(C_6HF_4)_3$.

The oxygen-containing compound (b) may be an alkyl aluminoxane represented by the following formula, which is a product of the reaction of an alkylaluminum and a condensation reagent (e.g. water).

$$-\!\left[\underset{\displaystyle R^8}{\underset{|}{Al}}-O\right]_j\!- \qquad \text{(VII)}$$

where $R^8$ is an alkyl group having 1 to 8 carbon atoms, and j is a integer of 2 to 50.

The chain structure of an alkyl aluminoxane may be a linear or a cyclic structure.

(E) Alkylaluminum Compound

In the preparation process of the supported catalyst of the present invention, an alkylaluminum compound represented by the following formula (H) can be optionally used:

$$AlR^9_3 \qquad \text{(H)}$$

where $R^9$ is an alkyl group having 1 to 8 carbon atoms.

Cocatalyst

The supported catalyst of the present invention is preferable to use in combination with a cocatalyst for preparing a syndiotactic polymer. The component (D) individually or in combination with the component (E) may be used as the cocatalyst.

Monomer

The styrenic monomer is polymerized to prepare syndiotactic styrenic polymer by using the supported catalyst provided by the present invention. The styrenic monomer is represented by the formula (IX):

(IX)

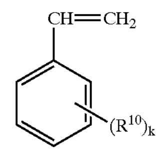

where each $R^{10}$ is selected from a hydrogen atom, a halogen atom, or a substituent containing a carbon atom, an oxygen atom, a nitrogen atom, a sulfur atom, a phosphorous atom, or a silicon atom, and k represents an integer of 1 to 3.

The styrenic monomer may be homopolymerized or two or more kinds of styrenic monomers may be copolymerized.

The monomers, which can be polymerized by the supported catalyst according to the present invention, are not limited to the styrenic monomers. Olefin monomers represented by the general formula (J) can also be homopolymerized and copolymerized with other olefin monomers or styrenic monomers.

$$\underset{\displaystyle R^{11}}{\underset{|}{CH}}=CH_2 \qquad \text{(X)}$$

where $R^{11}$ is selected from a hydrogen atom, and a linear or cyclic alkyl group having 1 to 20 carbon atoms.

Among the components for preparing a supported catalyst of the present invention, components (A), (B), and (C) are essential components, and components (D) and (E) as optional components may be used with components (A), (B), and (C).

The amount of components (A) and (B) in the supported catalyst is not specially limited. But, the amount of component (A) is preferably at least 0.001% by weight and that of component (B) is preferably at least 70% by weight. The amount of component (C) is also not specially limited, but it is preferably about 0.001 to 30% by weight. Finally, the amount of components (D) and (E) is also not specially limited.

FIG. 1 is a schematic diagram of process for preparing a supported catalyst according to the present invention. The reaction procedures and the addition sequences of these components for preparation of supported catalyst are not specifically limited, but those as shown in FIG. 1 are preferred.

The solvent used for preparation of the supported catalyst is not specifically limited, but aliphatic and aromatic hydrocarbon solvents are preferred, which is easily conducted by an ordinary skilled person in the art to which the present invention pertains. The reaction temperature for preparation of the supported catalyst is usually about from −100° C. to 150° C., preferably from 20 to 70° C.

The invention may be better understood by reference to the following examples, which are intended for the purpose of illustration and are not to be construed as in any way limiting the scope of the present invention, which is defined in the claims appended hereto. In the following examples, all parts and percentage are by weight unless otherwise indicated.

EXAMPLES

Example 1

Preparation of Homogeneous Catalyst, tri(4,4'-isopropylidenediphenol)di(pentamethylcyclopentadienyltitanium)[$(CH_3)_5CpTi]_2[(CH_3)_2C(C_6H_4O)_2$]

Preparation Method 1

To a dried 250 ml flask equipped with a magnetic stirrer, 80 ml of purified toluene, 2.3 g (10 mmol) of bisphenol-A and 5 ml (35.9 mmol) of dried triethyl amine (Aldrich, 99.5% of purity) were added under an atmosphere of nitrogen. The resultant solution was clear and colorless. The solution was cooled to −78° C. by an acetone-liquid nitrogen bath. With vigorous stirring, 2.0 g (6.8 mmol) of $Cp^*TiCl_3$ dissolved in 70 ml of toluene was added dropwise by cannular. The reaction system, then was slowly warmed to room temperature and kept for 4 hours. The color of the solution was changed from red to yellow, and a white precipitate was yielded. The precipitate was filtered, and the solution was evacuated to dry. As a result, 3.4g of a yellow solid was obtained in a quantitative yield.

Preparation Method 2

To a dried 250 ml flask equipped with a magnetic stirrer, 80 ml of purified toluene, and 2.42 g (10.6 mmol) of bisphenol-A were added under an atmosphere of nitrogen, and then 2.0 g (7.1 mmol) of $Cp^*Ti(OCH_3)_3$ dissolved in 70 ml of toluene was added dropwise with stirring. The reaction system then was kept at room temperature for 4 hours, and was dried under vacuum. As a result, 3.4 g of a yellow solid was obtained in a quantitative yield.

By $^1H$ NMR and $^{13}C$ NMR, the products obtained by the two methods mentioned above, have exactly the same structure represented by the following formula (XI). The homogeneous catalyst as made was named HomoCat-1.

(XI)

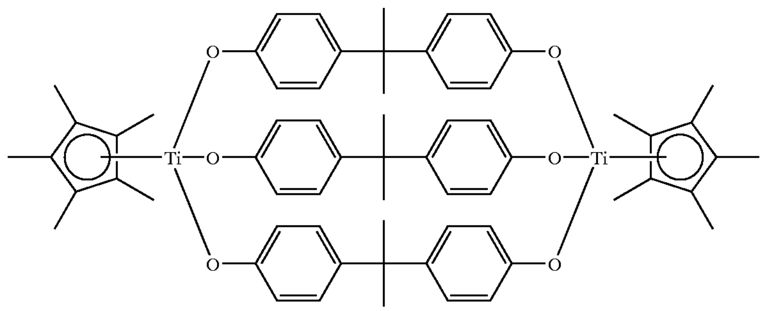

Example 2

To a dried 250 ml flask equipped with a magnetic stirrer, 4 g of silica (Aldrich, calcinated at 700° C.), 0.5 g of styrene-acrylonitrile (SAN, 23 wt % of acrylonitrile content, Mw: 90,000) polymer, and 80 ml of toluene were added under an atmosphere of nitrogen. The resultant slurry was stirred at a room temperature for 2 hours until complete dissolution of SAN polymer. The toluene was then removed by decantation followed by drying under vacuum. Thus, a white solid support precursor, and 2 mmol of methylaluminoxane (MAO) in 80 ml of toluene was added at room temperature. The slurry was kept at room temperature with stirring for 30 minutes, and then toluene was removed by decantation followed by drying under vacuum. As a result, a white solid was obtained as a support precursor II.

0.2 mmol of a homogeneous catalyst, HomoCat-1 prepared by Example 1, in 80 ml of toluene was injected by cannular to the support precursor II. The resultant slurry was kept at room temperature with stirring for 30 minutes and then was filtered. The solid was washed with 50 ml of toluene for 3 times, and then was dried by vacuum.

The resultant toluene solution was analyzed by ICP, its content of titanium was found at a level of negligence, about 0.02 $\mu$mol/cc. In contrast, the resultant pale-yellow solid, which was obtained as the final supported catalyst, was determined by ICP to be 0.0433 mmlo/g. As a result, a content of titanium removed by washing could be neglected. Therefore the content of titanium in a supported catalyst can be calculated directly from the content of titanium in an original homogeneous catalyst and the weight of the resultant supported catalyst.

The resultant pale-yellow solid was obtained as the final supported catalyst, and its titanium content was determined by ICP to be 0.0433 mmlo/g.

TABLE 1

| Example | $SiO_2$ (g) | SAN (g) | MAO (mmol) | HomoCat-1 (mmol) | Ti Content (mmol/g) |
|---|---|---|---|---|---|
| 2 | 4 | 0.5 | 2.0 | 0.2 | 0.0433[a)] |
| 3 | 4 | 0.5 | 2.0 | 0.6 | 0.0433[a)] |
| 4 | 4 | 0.5 | 2.0 | 0.8 | 0.0433[a)] |
| 5 | 4 | 0.5 | 2.0 | 0.2 | 0.0433[b)] |
| 6 | 4 | 0.5 | 8.0 | 0.2 | 0.0433[b)] |
| 7 | 4 | 0.5 | 0.2 | 0.2 | 0.0433[b)] |
| 8 | 4 | 0.5 | 2.0 | 0.2 | 0.0433[b)] |
| 9 | 4 | 0.5 | 2.0 | 0.2 | 0.0433[b)] |
| 10 | 4 | 0.5 | 0 | 0.2 | 0.0433[b)] |
| 11 | 4 | 0.5 | 0 | 0.2<br>Cp *Ti($OCH_3$)$_3$ | |
| Comp.Ex.1 | 4 | 0 | 2.0 | 0.2 | 0.0433[b)] |

a) Determination by ICP
b) Theoretical value by calculation

Examples 3–4

The same procedure as in Example 2 was followed with the exception that a homogeneous catalyst (HomoCat-1) was added as shown in Table 1.

Example 5

The same procedure as in Example 2 was followed with the exception that 0.2g of a SAN polymer was used for preparing a support precursor I, the content of components used are given in Table 1.

Examples 6–7

The same procedure as in Example 2 was followed with the exception that a MAO was added as shown in Table 1 for preparing a support precursor II.

Example 8

To a dried 250 ml flask equipped with a magnetic stirrer, 4 g of silica, 2.0 mmol of methylaluminoxane in 80 ml of toluene were added under an atmosphere of nitrogen. The resultant slurry was stirred at a room temperature for 30 minutes, and then the toluene was then removed by decantation followed by drying under vacuum. Thus, a white powder was obtained.

SAN polymer (the same as Example 2) in 80 ml of toluene was injected by cannular to the white powder. The resultant slurry was kept at room temperature with stirring for 2 hours and then was filtered. The solid was washed with 50 ml of toluene for 3 times, and then was dried by vacuum As a result another white powder was obtained.

0.2 mmol of HomoCat-1 prepared in Example 1, in 80 ml of toluene was injected to the white powder by cannular. The resultant slurry was stirred at a room temperature for 30 minutes, and then was filtered. The solid filtered was washed with 50 ml of toluene for 3 times, and then was dried by vacuum. The resultant pale-yellow solid was obtained as the final supported catalyst, and its titanium content was determined by ICP to be 0.0433 mmlo/g.

Example 9

The same procedure as in Example 2 was followed for preparing a support precursor I. 0.2 mmol of HomoCat-1 prepared in Example 1 in 80 ml of toluene was injected by cannular. The resultant slurry was stirred at a room temperature for 30 minutes, and then was filtered. The solid filtered was treated with 2 mmol of MAO in 80 ml of toluene for another 30 minutes at room temperature with stirring. The resultant slurry was filtered, and then washed with 50 ml of toluene for 3 times. After vacuum dry, a pale-yellow solid was obtained, and its titanium content was determined by ICP to be 0.0433 mmlo/g.

Example 10

The same procedure as in Example 2 was followed for preparing a support precursor I. 0.2 mmol of HomoCat-1 prepared in Example 1 in 80 ml of toluene was injected by cannular. The resultant slurry was stirred at a room temperature for 30 minutes, and then was filtered. The solid filtered was washed with 50 ml of toluene for 3 times. After vacuum dry, a pale-yellow solid was obtained as the final supported catalyst, and its titanium content was determined by ICP to be 0.0433 mmol/g.

Example 11

The same procedure as in Example 5 was followed for preparing a support precursor II. To this support catalyst II, 0.2 mmol of a homogeneous catalyst, Cp*Ti($OCH_3$)$_3$(Steam Chemicals Co. Ltd.) in 80 ml of toluene was injected by cannular. The resultant slurry was stirred at a room temperature for 30 minutes, and then was filtered. The solid filtered was washed with 50 ml of toluene for 3 times. After vacuum dry, a pale-yellow solid was obtained as a supported catalyst, and its titanium content was determined by ICP to be 0.0433 mmol/g.

Comparative Example 1

The same procedure as in Example 2 was followed with the exception that a SAN polymer was not used for preparing a support precursor I, the content of components used are given in Table 1.

Example 12

To a dried 1L glass reactor, equipped with a circulation water jacket for temperature control and a double helical impeller (made of steel), 200 ml of a purified styrene monomer and 8 ml of 2 M triisobutylaluminum (TiBA) in toluene solution were added. The solution was stirred at 70° C. and 400 rpm for 10 minutes, and then 0.28 ml (0.8 mmol) of 2.8 M of methylaluminoxane and 0.18 g (0.008 mmol) of a supported catalyst prepared in Example 2, which had been suspended in 3 ml of toluene in advance, were injected successively until total amount of 0.04 mmol of a supported catalyst and 4 mmol of a methylaluminoxane were injected. The total feeding time was 40 minutes and the polymerization was processed another 80 minutes. The solution was quenched by a large amount of methanol after total polymerization time of 2 hours. The polymer was filtered and dried by vacuum at 150° C. As a result, 84.9 g of a polymer was obtained. The conversion was 46.7% by weight and its activity was 44.4 kg/g Ti.

As a result of analysis of the polymer obtained by $^{13}C$ NMR and DSC, the polymer was a highly syndiotactic polystyrene with the melting point of 70° C. The weight average molecular weight (Mw) of the polymer determined by GPC was 540,400 and molecular weight distribution (Mw/Mn) was 2.22.

Examples 13–14

The same procedure as in Example 12 was followed with the exception that the supported catalysts, which have different contents of titanium as shown in Table 1, prepared from Examples 3 and 4 were used respectively. The polymerization data were shown in Table 2.

Example 15

The same procedure as in Example 12 was followed with the exception that the supported catalyst prepared from Example 5 was used. The polymerization data were shown in Table 2.

Examples 16–17

The same procedure as in Example 12 was followed with the exception that the supported catalysts prepared from Examples 6 and 7 were used respectively. The polymerization data were shown in Table 2.

Examples 18–19

The same procedure as in Example 12 was followed with the exception that the supported catalysts prepared from Examples 8 and 9 were used respectively. The polymerization data were shown in Table 2.

Example 20

The same procedure as in Example 12 was followed with the exception that the supported catalyst prepared from Example 10 was used. The polymerization data were shown in Table 2.

Example 21

The same procedure as in Example 12 was followed with the exception that the supported catalyst prepared from Example 11 was used. The polymerization data were shown in Table 2.

TABLE 2

| Example | Supported Catalyst | Conversion Rate (%) | Activity (kg/g Ti) | Mw (g/mol) | MWD (Mw/Mn) |
|---|---|---|---|---|---|
| 12 | Example 2 | 46.7 | 44.4 | 540,400 | 2.22 |
| 13 | Example 3 | 43.8 | 41.6 | 524,000 | 2.73 |
| 14 | Example 4 | 51.3 | 48.8 | 560,800 | 4.44 |
| 15 | Example 5 | 44.0 | 42.5 | 559,400 | 2.35 |
| 16 | Example 6 | 16.0 | 15.2 | 695,000 | 2.17 |
| 17 | Example 7 | 43.0 | 40.1 | — | — |
| 18 | Example 8 | 20.4 | 19.4 | 684,000 | 1.87 |
| 19 | Example 9 | 17.5 | 16.6 | 557,000 | 2.76 |
| 20 | Example 10 | 26.4 | 25.5 | — | — |
| 21 | Example 11 | 28.4 | 27.4 | — | — |
| Comparative Example 2 | Comparative Example 1 | 0 | 0 | — | — |

Polymerization conditions: 200 ml of styrene monomer, 0.04 mmol of total catalyst, 16 mmol of triisobutylaluminum (TiBA), [TiBA]/[Ti]=400, 4 mmol of total methylaluminoxane (MAO); 70° C. of polymerization temperature; 400 rpm; 2 hours of total polymerization time.

Comparative Example 2

The same procedure as in Example 12 was followed with the exception that the support precursor of the Comparative Example 1, which was prepared without using any SAN polymer, was used. No polymer was obtained under the polymerization conditions listed in Table 2.

Example 22

In order to test a supported catalyst performance in a commercial scale, Example 22 was performed under enlarged scale.

A 1 L glass autoclave reactor was used as the supported catalyst polymerization reactor. To the completely dried reactor, 40 g of silica, 5 g of styrene-acrylonitrile polymer were added under an atmosphere of nitrogen. The reactor was evacuated at 70° C. for 30 minutes, 300 ml of toluene was transferred to the reactor under pressurization of nitrogen. The reactor was kept at 70° C. with stirring at 400 rpm for 2 hours. After complete dissolution of the SAN polymer, toluene was removed by decantation followed by drying under vacuum. 20 mmol of methylaluminoxane (MAO) in 200 ml of toluene was added. After stirring at 70° C. for 30 minutes, toluene was again removed by decantation followed by drying under vacuum, and then 2 mmol of a homogeneous catalyst, HomoCat-1, prepared in Example 1 in 200 ml of toluene was added. After stirring at 70° C. for another 30 minutes, the slurry was filtered and the solid was washed with 100 ml of toluene for 3 times, and then was dried completely by vacuum. As a result, a pale-yellow powder was obtained as the final product. Titanium content of the resultant pale-yellow solid was determined by ICP to be 0.0433 mmol/g.

Example 23

The same procedure as in Example 22 was followed with the exception of using 2 g of a SAN polymer instead of 5 g of a SAN polymer.

Example 24

The same procedure as in Example 22 was followed with the exception that the addition step of MAO was omitted.

To a completely dried reactor, 40 g of silica, 5 g of styrene-acrylonitrile polymer were added under an atmosphere of nitrogen. The reactor was evacuated at 70° C. for 30 minutes, 300 ml of toluene was transferred to the reactor under pressurization of nitrogen. The reactor was kept at 70° C. with stirring at 400 rpm for 2 hours. After complete dissolution of the SAN polymer, toluene was removed by decantation followed by drying under vacuum. 2 mmol of a homogeneous catalyst, HomoCat-1, prepared in Example 1 in 200 ml of toluene was added. After stirring at 70° C. for another 30 minutes, the slurry was filtered and the solid was washed with 100 ml of toluene for 3 times, and then was dried completely by vacuum. As a result, a pale-yellow powder was obtained as the final product. Titanium content of the resultant pale-yellow solid was determined by ICP to be 0.0433 mmol/g.

Example 25

A 10 L autoclave reactor was purged with nitrogen at 100° C. for 2 hours, and then was cooled to 70° C. 2000 ml of styrene monomer and 40 ml of triisobutylaluminum (TiBA)

in toluene solution were transferred to the reactor by pressurization of nitrogen. The reactor was kept at 70° C. with stirring at 300 rpm for 10 minutes under an atmosphere of nitrogen. 8 mmol of methylaluminoxane (MAO) and 0.08 mmol of supported catalyst (in toluene suspension) prepared in Example 22 were injected. The feeding operation of MAO and a supported catalyst, in the same amount as mentioned above After stirring at 70° C. for 30 minutes, toluene was again removed by decantation followed by drying under vacuum, and then 2 mmol of a homogeneous catalyst, HomoCat-1, prepared in Example 1 in 200 ml of toluene was added. After stirring at 70° C. for another 30 minutes, the slurry was filtered and the solid was washed with 100 ml of toluene for 3 times, and then was dried completely by vacuum. As a result, a pale-yellow powder was obtained as the final product. Titanium content of the resultant pale-yellow solid was determined by ICP to be 0.0433 mmol/g.

TABLE 3

| Example | Supported Catalyst | [Ti] (mmol/ L-SM) | [TiBA]/ [Ti] | Conversion (wt %) | Activity (kg/g Ti) |
|---|---|---|---|---|---|
| 25 | Example 22 | 0.2 | 100 | 60.9 | 115.8 |
| 26 | Example 22 | 0.1 | 150 | 29.9 | 113.7 |
| 27 | Example 22 | 0.1 | 200 | 28.4 | 108.0 |
| 28 | Example 23 | 0.1 | 200 | 35.6 | 135.4 |
| 29 | Example 24 | 0.2 | 400 | 30.3 | 57.6 |

Polymerization conditions: 2000 ml of styrene monomer, [MAO]/[Ti] = 100; 70° C. of polymerization temperature; 300 rpm; 3 hours of total polymerization time.

Examples 26–27

The same procedure as in Example 25 was followed with the exception that the concentration of a catalyst and the ratio of [TiBA]/[Ti] were different from those of Example 25. The results of polymerization reaction were shown in Table 3.

Example 28

The same procedure as in Example 25 was followed with the exception that the support precursor of the Example 23 was used. The results of polymerization reaction were shown in Table 3.

Example 29

The same procedure as in Example 25 was followed with the exception that the support precursor of the Example 24 was used. The results of polymerization reaction were shown in Table 3.

TABLE 4

| Example | Supported Catalyst | [Ti] (mmol/ L-hexan) | [TiBA]/ [Ti] | Yield | Activity (kg/mol · Ti · hr) |
|---|---|---|---|---|---|
| 30 | 2 | 0.2 | 100 | 0.09 | 2.2 |
| Comp. Ex. 3 | 1 | 0.2 | 100 | 2.38 | 58 |

Polymerization condition: 200 ml of hexane, 4 kg/cm$^2$ of ethylene pressure, 70° C. of polymerization temperature, total polymerization time 1 hour

Example 30

To a 1 L well-dried glass autoclave, 200 ml of polymerization grade hexane and 2 ml of 2 M triisobutylaluminum toluene solution was introduced under an atmosphere of nitrogen at 70° C. After stirring at 700 rpm for 10 minutes, 0.92 g of a supported catalyst prepared in Example 2 was added as a suspension in 10 ml of toluene, and then polymerization grade ethylene was introduced. The reactor was kept at an ethylene pressure of 60 psi for 1 hour. The polymerization reaction was terminated with methanol and polymer was collected by filtration, then dried in vacuum. As a result, 2.3 g of polyethylene powder in spherical morphology was obtained. The activity of the catalyst was 58 kg/molTihr.

Comparative Example 3

The same procedure as in Example 30 was followed with the exception that the homogeneous precursor of the Example 1 was used. The results of polymerization reaction were shown in Table 4.

TABLE 5

| Example | Supported Catalyst | [Ti] (mmol/ L-SM) | [MAO]/[Ti] | Yield | Activity (kg/mol · Ti · hr) |
|---|---|---|---|---|---|
| 31 | Example 2 | 0.1 | 500 | 6.92 | 346 |
| Comp. Ex. 4 | Example 1 | 0.1 | 500 | — | — |

Polymerization condition: 200 ml of hexane, 4 kg/cm$^2$ of ethylene pressure; 70° C. of polymerization temperature; 700 rpm; total polymerization time 1 hour

Example 31

Ethylene-styrene Copolymerization

To a 1 L well-dried glass autoclave, 200 ml of purified styrene monomer (SM) and 3.5 ml of 2.8 M methylaluminoxane toluene solution was introduced under an atmosphere of nitrogen at 70° C. After stirring at 700 rpm for 10 minutes, 0.46 g (0.02 mmol) of a supported catalyst prepared in Example 2 was added as a suspension in 10 ml of toluene, and then polymerization grade ethylene was introduced. The reactor was kept at an ethylene pressure of 60 psi for 1 hour. The polymerization reaction was terminated with methanol and polymer was collected by filtration, and then dried in vacuum. As a result, 6.92 g of copolymer was obtained. The activity of the catalyst was 346 kg/mol·Tihr. The polymerization conditions and data were shown in Table 5.

Comparative Example 4

The same procedure as in Example 31 was followed with the exception that the homogeneous precursor of the Example 1 was used. The polymer obtained was analyzed by $^{13}$C NMR to be a syndiotactic polystyrene, and no polyethylene or ethylene-containing copolymer was found.

The present invention has been described based on preferred embodiments of the present invention, but it should be apparent to those ordinarily skilled in the art that various changes and modifications can be added without departing from the spirit and scope of the present invention. Such changes modifications come within the scope of the present invention.

What is claimed is:

1. A supported catalyst comprising:

a polymer having at least one polar group;

a support having a surface that is reactive with a catalyst; and a catalyst comprising a transition metal compound, wherein the polymer insulates the catalyst from the surface of the support such that the catalyst does not react with the surface of the support, and wherein the transition metal compound is at least one compound represented by formulas I–V:

$$MR^1_aR^2_bR^3_cX_{4-(a+b+c)} \quad (I)$$

$$MR^1_dR^2_eX_{3-(d+e)} \quad (II)$$

$$R^1_dR^2_eX^1_{3-(d+e)}M^1—O—R^4—O—M^2R^1_dR^2_eX^1_{3-(d+e)} \quad (III)$$

(IV)

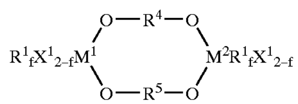

(V)

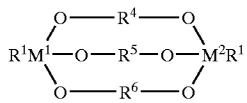

where M, $M^1$, and $M^2$ is an atom of Group IVB;

$R^1$, $R^2$, and $R^3$ are independently a hydrogen atom, an alkyl group having 1 to 20 carbon atoms, an alkoxy group having 1 to 20 carbon atoms, an aryl group having 6 to 20 carbon atoms, an alkylaryl group having 6 to 20 carbon atoms, an arylalkyl group having 6 to 20 carbon atoms, an aryloxy group having 1 to 20 carbon atoms, a cyclopentadienyl group, a substituted cyclopentadienyl group or an indenyl group, wherein $R^1$, $R^2$, and $R^3$ may be the same or different;

X is a halogen atom;

$R^4$, $R^5$, and $R^6$ are independently an alkylene group having 1 to 20 carbon atoms, an arylene group having 6 to 20 carbon atoms, an alkylarylene group having 6 to 20 carbon atoms, an arylalkylene group having 6 to 20 carbon, a cyclopentadienylene group, a substituted cyclopentadienylene group or an indenylene group, wherein $R^4$, $R^5$, and $R^6$ may be the same or different;

a, b and c are an integer of 0 to 4;

d and e are an integer of 0 to 3; and f is independently an integer of 0 to 2.

2. The supported catalyst of claim 1 further comprising either a compound that forms an ionic complex by a reaction with the transition metal compound or an oxygen-containing compound.

3. The supported catalyst of claim 2 further comprising an alkylaluminum compound.

4. The supported catalyst according to claim 1, 2 or 3, wherein the polymer is selected from the group consisting of an acrylonitrile containing polymer or copolymer, a hydroxyl group containing polymer or copolymer, an acrylate-containing polymer or copolymer, a maleic anhydride-containing polymer or copolymer, an acetate-containing polymer or copolymer, a polyether, a polyketone, and a polyamide-containing polymer or copolymer.

5. The supported catalyst of claim 4, wherein the polar group containing polymer is a styrene-acrylonitrile polymer.

6. The supported catalyst of claim 5, wherein the styrene-acrylonitrile polymer has a degree of polymerization of at least 5, and contains about 0.1 to 100% by weight of acrylonitrile.

7. The supported catalyst of claim 1 wherein the content of the polymer is from about 0.001 to about 99.999 percent by weight.

8. The supported catalyst of claim 1 wherein the support is an inorganic support.

9. The supported catalyst of claim 8 wherein the inorganic support is selected from the group consisting of silica gel, alumina, silica-alumina gel, zeolite, mica powder, clays, molecular sieves, metal oxide compounds, metal halogenides, metal carbonates and metal powder.

10. The supported catalyst of claim 1 wherein the content of the transition metal compound is from about 0.0001 to about 30 percent by weight.

11. A method of producing a supported catalyst comprising the steps of:

providing a polymer coating around a support, the support having a surface that is reactive with a catalyst comprising a transition metal compound, and wherein the polymer comprises at least one polar group;

adding the catalyst comprising the transition metal compound to the coated support, wherein the polymer coating insulates the catalyst from the surface of the support such that the catalyst does not react with the surface of the support, and wherein the transition metal compound is at least one compound represented by formulas I–V:

$$MR^1_aR^2_bR^3_cX_{4-(a+b+c)} \quad (I)$$

$$MR^1_dR^2_eX_{3-(d+e)} \quad (II)$$

$$R^1_dR^2_eX^1_{3-(d+e)}M^1—O—R^4—O—M^2R^1_dR^2_eX^1_{3-(d+e)} \quad (III)$$

(IV)

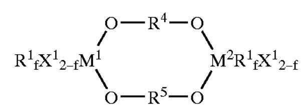

(V)

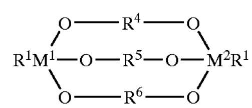

where M, $M^1$, and $M^2$ is an atom of Group IVB;

$R^1$, $R^2$, and $R^3$ are independently a hydrogen atom, an alkyl group having 1 to 20 carbon atoms, an alkoxy group having 1 to 20 carbon atoms, an aryl group having 6 to 20 carbon atoms, an alkylaryl group having 6 to 20 carbon atoms, an arylalkyl group having 6 to 20 carbon atoms, an aryloxy group having 1 to 20 carbon atoms, a cyclopentadienyl group, a substituted cyclopentadienyl group or an indenyl group, wherein $R^1$, $R^2$, and $R^3$ may be the same or different;

X is a halogen atom;

$R^4$, $R^5$, and $R^6$ are independently an alkylene group having 1 to 20 carbon atoms, an arylene group having 6 to 20 carbon atoms, an alkylarylene group having 6 to 20 carbon atoms, an arylalkylene group having 6 to 20 carbon, a cyclopentadienylene group, a substituted cyclopentadienylene group or an indenylene group, wherein $R^4$, $R^5$, and $R^6$ may be the same or different;

a, b and c are an integer of 0 to 4;

d and e are an integer of 0 to 3; and f is independently an integer of 0 to 2.

12. The method of claim 11 further comprising the step of adding at least one of:

a. either a compound that forms an ionic complex by a reaction with the transition metal compound or b. an alkylaluminum compound, before the step of adding the catalyst.

13. The method according to claim 11 or 12, wherein the polymer is selected from the group consisting of an acrylonitrile containing polymer or copolymer, a hydroxyl group containing polymer or copolymer, an acrylate-containing polymer or copolymer, a maleic anhydride-containing polymer or copolymer, an acetate-containing polymer or copolymer, a polyether, a polyketone, and a polyamide-containing polymer or copolymer.

14. The method of claim 13, wherein the polar group containing polymer is a styrene-acrylonitrile polymer.

15. The method of claim 14, wherein the styrene-acrylonitrile polymer has a degree of polymerization of at least 5, and contains about 0.1 to 100% by weight of acrylonitrile.

16. The method of claim 11 wherein the support is an inorganic support.

17. The method of claim 16 wherein the inorganic support is selected from the group consisting of silica gel, alumina, silica-alumina gel, zeolite, mica powder, clays, molecular sieves, metal oxide compounds, metal halogenides, metal carbonates and metal powder.

18. A method of producing syndiotactic styrenic polymer comprising the steps of:

providing at least one type of styrene monomer represented by formula IX:

(IX)

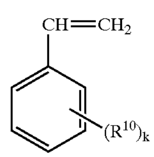

where each $R^{10}$ is selected from a hydrogen atom, a halogen atom, or a substituent containing a carbon atom, an oxygen atom, a nitrogen atom, a sulfur atom, a phosphorous atom, or a silicon atom, and k represents an integer of 1 to 3;

adding a supported catalyst comprising:

a polymer having at least one polar group;

a support having a surface that is reactive with a catalyst; and a catalyst comprising a transition metal compound, wherein the polymer insulates the catalyst from the surface of the support such that the catalyst does not react with the surface of the support;

adding at least one type of ethylene monomer represented by formula X:

$$\underset{R^{11}}{\underset{|}{CH}}{=}CH_2 \quad \text{(X)}$$

wherein $R^{11}$ is selected from a hydrogen atom, and a linear or cyclic alkyl group having 1 to 20 carbon atoms; and reacting the at least one type of styrene monomer and the at least one type of ethylene monomer in the presence of the supported catalyst.

19. The method of claim 18, wherein the polymer is selected from the group consisting of an acrylonitrile containing polymer or copolymer, a hydroxyl group containing polymer or copolymer, an acrylate-containing polymer or copolymer, a maleic anhydride-containing polymer or copolymer, an acetate-containing polymer or copolymer, a polyether, a polyketone, and a polyamide-containing polymer or copolymer.

20. The method of claim 19, wherein the polar group containing polymer is a styrene-acrylonitrile polymer.

21. The method of claim 20, wherein the styrene-acrylonitrile polymer has a degree of polymerization of at least 5, and contains about 0.1 to 100% by weight of acrylonitrile.

22. The method of claim 18 wherein the support is an inorganic support.

23. The method of claim 22 wherein the inorganic support is selected from the group consisting of silica gel, alumina, silica-alumina gel, zeolite, mica powder, clays, molecular sieves, metal oxide compounds, metal halogenides, metal carbonates and metal powder.

24. The method according to claim 18, 19, 20, or 23 wherein the transition metal compound is at least one compound represented by formulas I–V:

$$MR^1_aR^2_bR^3_cX_{4-(a+b+c)} \quad \text{(I)}$$

$$MR^1_dR^2_eX_{3-(d+e)} \quad \text{(II)}$$

$$R^1_dR^2_eX^1_{3-(d+e)}M^1{-}O{-}R^4{-}O{-}M^2R^1_dR^2_eX^1_{3-(d+e)} \quad \text{(III)}$$

(IV)

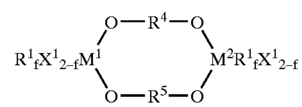

(V)

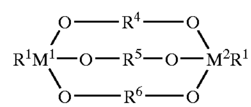

where M, $M^1$, and $M^2$ is an atom of Group IVB;

$R^1$, $R^2$, and $R^3$ are independently a hydrogen atom, an alkyl group having 1 to 20 carbon atoms, an alkoxy group having 1 to 20 carbon atoms, an aryl group having 6 to 20 carbon atoms, an alkylaryl group having 6 to 20 carbon atoms, an arylalkyl group having 6 to 20 carbon atoms, an aryloxy group having 1 to 20 carbon atoms, a cyclopentadienyl group, a substituted cyclopentadienyl group or an indenyl group, wherein $R^1$, $R^2$, and $R^3$ may be the same or different;

X is a halogen atom;

$R^4$, $R^5$, and $R^6$ are independently an alkylene group having 1 to 20 carbon atoms, an arylene group having 6 to 20 carbon atoms, an alkylarylene group having 6 to 20 carbon atoms, an arylalkylene group having 6 to 20 carbon, a cyclopentadienylene group, a substituted cyclopentadienylene group or an indenylene group, wherein $R^4$, $R^5$, and $R^6$ may be the same or different;

a, b and c are an integer of 0 to 4;

d and e are an integer of 0 to 3; and f is independently an integer of 0 to 2.

* * * * *